United States Patent [19]

Kao et al.

[11] 4,183,621
[45] Jan. 15, 1980

[54] WATER RESISTANT HIGH STRENGTH FIBERS

[75] Inventors: Charles K. Kao; Mokhtar S. Maklad, both of Roanoke, Va.

[73] Assignee: International Telephone and Telegraph Corporation, Nutley, N.J.

[21] Appl. No.: 865,643

[22] Filed: Dec. 29, 1977

[51] Int. Cl.² ............................................. G02B 5/14
[52] U.S. Cl. .................................. 350/96.30; 350/67; 350/96.33; 350/96.34
[58] Field of Search ............... 350/96.29, 96.30, 96.33, 350/96.34, 96.23, 67; 174/126 CP

[56] References Cited

U.S. PATENT DOCUMENTS

| | | | |
|---|---|---|---|
| 3,050,907 | 8/1962 | Hicks et al. | 350/96.26 |
| 3,722,981 | 3/1973 | Pinnow et al. | 350/96.30 |
| 3,980,390 | 9/1976 | Yamamoto et al. | 350/96.33 |
| 4,072,400 | 2/1978 | Claypoole et al. | 350/96.33 |
| 4,113,350 | 9/1978 | Haines | 350/96.29 |

Primary Examiner—Stewart J. Levy
Attorney, Agent, or Firm—John T. O'Halloran; Peter C. Van Der Sluys

[57] ABSTRACT

Optical communication fibers having improved fatigue resistance are provided by encapsulating the fibers in a water impervious material. The water impervious material prevents the interaction of water with glass along the fiber outer surface and prolongs the operational life-time of the fibers.

8 Claims, 7 Drawing Figures

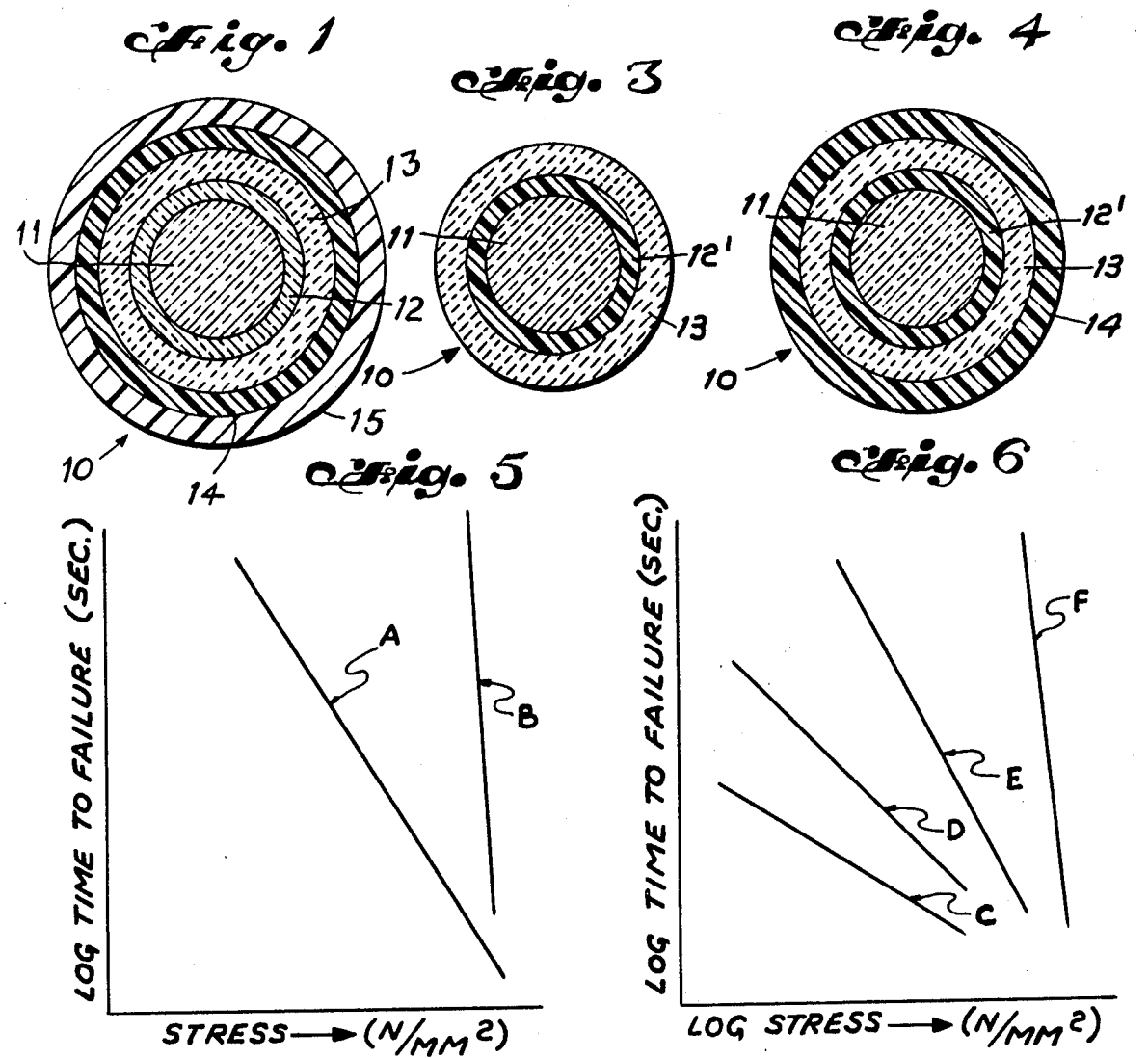
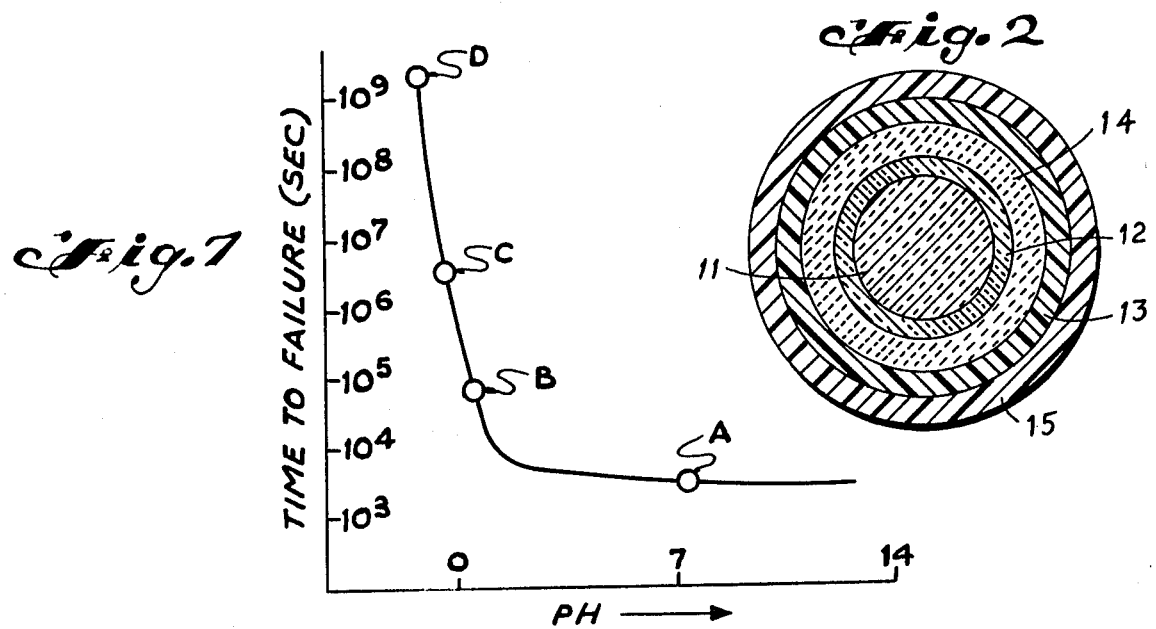

WATER RESISTANT HIGH STRENGTH FIBERS

BACKGROUND OF THE INVENTION

One of the reasons for the mechanical failure occurring with optical communication fibers over extended periods of use is caused by the fatigue of the fibers under prolonged subjection to stress along the axis of the fiber. The failure mechanism over extended periods of stress is in part due to the presence of water molecules and hydroxyle groups on the glass surface of the fibers.

With glass-on-glass optical fibers wherein the core material comprises a glass material and the cladding comprises a glass material, the presence of water molecules on the outer glass surface and residue stresses cause the glass network on the outer surface to become substantially weakened over a period of time so that the fiber ruptures under stress forces that are incapable of causing the fibers to fracture in the absence of water or water vapor.

In the fiber drawing operation the glass-on-glass optical fiber is coated with a silicone resin immediately after drawing and a thermoplastic resin is subsequently coated over the silicone material. Although the silicone material is effective to prevent dust particles from contacting the outer glass surface, the silicone material is relatively porous to water. Over a period of exposure in air, at ordinary concentrations of water vapor, water is able to permeate through the silicone layer and interacts with the outer glass surface.

The same mechanism of fatigue failure occurs with plastic clad silica optical fibers wherein the core material comprises silica and the silicone material comprises the cladding layer. Although the extruded thermoplastic jacket covering the silicone material retards the permeation of water through the silicone layer to some degree, water can permeate through the jacket to the silicone material and from there through to the glass surface.

One of the purposes of this invention therefore is to provide an interfacial water impervious layer to the glass optical fiber surface.

SUMMARY OF THE INVENTION

This invention contemplates the interposition of a water impervious layer to the surface of a glass optical communication fiber to improve the fatigue characteristics of the fiber.

One embodiment of the invention comprises the application of an impervious carbon layer directly onto the outer glass surface of a glass-on-glass optical fiber and overcoating the carbon layer with a first coating of silicone and a second coating of a thermoplastic.

A further embodiment of the invention comprises the interposition of a carbon coating over the silicone layer to prevent any atmospheric water from penetrating through the silicone layer to the glass fiber optic surface.

BRIEF DESCRIPTION OF THE DRAWINGS

FIG. 1 is a cross section of a glass-on-glass optical fiber having a carbon layer according to the invention and an outer silicone layer;

FIG. 2 is a cross section of a glass-on-glass optical fiber showing an alternate location for the carbon layer;

FIG. 3 is a cross sectional view of a plastic clad silica optical fiber containing an outer carbon layer according to the invention;

FIG. 4 is a cross sectional view of a further embodiment of the carbon coated optical fiber according to the invention;

FIG. 5 is a graphic representation of the fiber fatigue characteristic as a function of stress, for a carbon coated optical fiber and an uncoated optical fiber;

FIG. 6 is a graphic representation of the fiber failure rate as a function of applied stress; and FIG. 7 is a graphic representation of the time to failure for optical fibers under varying pH conditions.

DESCRIPTION OF THE PREFERRED EMBODIMENT

FIG. 1 is a cross section of a glass-on-glass optical fiber 10 wherein the core 11 consists of a doped silica material and the cladding 12 consists of a silica material having a lower refractive index than the core 11. A layer of graphite 13 is coated over the exterior surface of the glass-on-glass optical fiber 10 in order to provide a water impervious barrier to the fiber 10. The carbon layer 13 is effective in keeping water from contacting the surface of the silica cladding 12 and for preventing reactions from occurring therewith. A silicone layer 14 is provided over the carbon layer 13 and a thermoplastic jacket 15 is extruded over layer 14.

FIG. 2 shows an alternate embodiment of a glass-on-glass optical fiber 10 wherein the carbon layer 13 is disposed over the silicone layer 14 and under the jacket 15.

FIG. 5 shows the time to failure as a function of stress for uncoated optical fibers (A) and for optical fibers coated with a water impervious layer of carbon (B). Although the reasons for the failure of optical fibers under prolonged conditions of stress are not fully understood, they are related to the reaction occurring when water reaches microcracks along the outer silica surface.

The presence of the water impervious carbon coating 13 prevents the water from contacting the microcracks that may exist as surface defects along the perimeter of the silica layer 12 and cause the optical fiber 10 to fail under stresses that would not be sufficient to cause the fiber to fail in the absence of moisture. One explanation for the failure mechanism, designated as "fatigue failure", is the chemical inter-reaction between the water and the exposed silica at the point of fissure. The presence of the water impervious carbon material 13 prevents moisture from contacting the surface of silica 12, and therefore prolongs the operational life of optical fibers under tension.

FIG. 3 is a cross section of a plastic clad silica optical fiber 10 with the graphite layer 13 over the plastic cladding 12'. The plastic cladding material 12' for the purpose of this embodiment comprises silicone resin having an index of refraction lower than that of the silica core 11.

Carbon is chosen for the embodiment of this invention because of the good watertight film formed by carbon on glass and further for the lubricating properties inherent with carbon films. The presence of the carbon layer 13 on the outer surface of the plastic cladding 12' also prevents the optical fibers 10 from scratching when coming into close contact within the close confines of a multi-fiber cable. A further benefit by the use of the carbon coating 13 of this invention, either directly on the silica of the fiber 10 or over the silicone layer 12', is to prevent crosstalk between fibers in a crowded optical communications cable. Carbon film used for the layer 13 is a very efficient light absorber and therefore prevents the light emanating from one fiber from reaching and interfering with the transmission of light through any of the adjacent fibers in the aforementioned communications cable.

Silicone material is relatively pervious to water so that the carbon coating 13 must be applied either directly to the outer surface of the silica or alternatively to the outer surface of the silicone material. The measured value for the permeability of silicone to water is 1.2 mg. per millimeter thickness of silicone material per square centimeter at a relative humidity of 96%. In operation the carbon-coated plastic clad silica optical fiber is additionally covered with an extruded thermoplastic material for added strength purposes. This configuration is shown in FIG. 4 where the silica core 11 and the silicone cladding 12' are enclosed by the graphite layer 13 and include the extruded plastic outer jacket 15.

The time to failure of optical fibers under conditions of continuing stress as a function of water concentration in the atmosphere is shown in FIG. 6. Here the time to failure for glass-on-glass optical fibers is shown as a function of stress for varying conditions of water content in the atmosphere. Curve C indicates the time to fail for optical fibers under conditions of relatively high concentrations of water in the atmosphere. Curve D indicates the time to fail for optical fibers in an atmosphere having a moderate level of water vapor. The failure rate in terms of the length of time required for failure as a function of stress in relatively low conditions of water in the atmosphere is shown at Curve E. The failure curve F for the carbon-coated fiber of this invention is also shown in FIG. 6 in an atmosphere comparable to the relative high humidity condition of the uncoated optical fibers at C.

In an attempt to determine whether the chemistry of the water at the surface of the fiber greatly affected the fiber failure rate the following mechanical test was performed. A plurality of pure silica optical fibers were drawn to a diameter of 5 thousandths of an inch and were subjected to 400,000 pounds per square inch stress under varying conditions of pH at the fiber surface. The results of this fatigue failure test are shown at FIG. 7 where point A indicates the time to failure for the silica fibers submersed in water having a pH of 7.0, Point B for a highly acidic pH of 0 and Point C for fibers in air at a relative humidity of approximately 50%. The fibers subjected to a vacuum of approximately $2 \times 10^{-2}$ torr are indicated at Point C and Point D is a projected failure time indication for carbon-coated optical fibers.

Various methods can be used to apply the water impervious carbon coatings to optical fibers. A simple method is to direct the optical fibers, during the drawing process and immediately after drawing, into a suspension of colloidal carbon particles in either an alcohol or water suspension to deposit the material and then heating the deposited material to conform the material to the fiber surface.

Other methods such as plasma coating, chemical vapor deposition or vacuum evaporation can also be used when pinhole-free films are to be employed. Carbon is used for the embodiment of this invention because of its light-opacity and lubricating properties. Other forms of graphite-like materials having a carbon or hydrocarbon base can also be employed. One relatively inexpensive method for applying the impervious carbon layer to optical fibers is to employ the pyrolysis in a reducing or inert atmosphere, of a hydrocarbon such as, for example, methane.

Although the water impervious graphite coated fibers of this invention are described specifically for optical communication purposes, this is by way of example only. The water impervious graphite coated fibers of this invention find application wherever high strength fibers may be employed.

We claim:

1. An optical communication fiber having improved fatigue resistance comprising:
    an optical fiber core of a glass material having a first index of refraction;
    a cladding material over the glass core having an index of refraction lower than that of the core; and
    a water impervious carbon layer over the cladding layer to prevent atmospheric moisture from reaching the surface of the cladding layer.

2. The fiber of claim 1, further including a layer of silicone material over the water impervious layer.

3. The fiber of claim 2, further including a layer of thermoplastic resin over the silicone layer.

4. The fiber of claim 1, further including a layer of silicone material interposed between the cladding material and the water impervious layer.

5. The fiber of claim 4, further including a thermoplastic layer over the water impervious layer.

6. The fiber of claim 1, further including a thermoplastic resin over the water impervious layer.

7. An optical fiber having improved fatigue resistance comprising:
    a glass core material having a first index of refraction;
    a cladding glass material disposed over the surface of said core material and having an index of refraction lower than said core material;
    a layer of silicone resin over the surface of the cladding material; and
    a water impervious carbon layer over the silicone resin to prevent atmospheric moisture from reaching the outer surface of the silicone resin.

8. The fiber of claim 7, further including an outer jacket of thermoplastic material over the water impervious layer to provide improved tensile strength to the fiber.

* * * * *